United States Patent [19]
Knapp

[11] 3,849,041
[45] Nov. 19, 1974

[54] APPARATUS FOR MANUFACTURING ENVIRONMENTAL SEED CELLS

[75] Inventor: Philip B. Knapp, Lynbrook, N.Y.

[73] Assignee: Minnesota Mining & Manufacturing Co., St. Paul, Minn.

[22] Filed: Apr. 30, 1973

[21] Appl. No.: 355,701

[52] U.S. Cl............. 425/110, 425/126 R, 425/128, 425/348 R, 221/278
[51] Int. Cl. ....................... B29c 3/02, B30b 11/12
[58] Field of Search .......... 425/110, 117, 126, 128, 425/348, 363, DIG. 804; 221/278

[56] References Cited
UNITED STATES PATENTS

| | | | |
|---|---|---|---|
| 2,879,724 | 3/1959 | Wyatt et al. ..................... | 425/126 |
| 2,946,298 | 7/1960 | Doepel et al. ................ | 425/128 X |
| 2,966,125 | 12/1960 | Stott ............................. | 425/126 X |
| 3,000,331 | 9/1961 | Frank .............................. | 425/126 |
| 3,105,609 | 10/1963 | Salfisberg ..................... | 221/278 X |
| 3,275,191 | 9/1966 | MacDonald ................... | 221/278 X |
| 3,540,622 | 11/1970 | Spisak ........................... | 221/278 X |
| 3,555,730 | 1/1971 | Brink ............................. | 425/128 X |
| 3,775,034 | 11/1973 | Knapp ........................... | 425/145 X |

Primary Examiner—Andrew R. Juhasz
Assistant Examiner—David B. Smith
Attorney, Agent, or Firm—Arthur B. Colvin

[57] ABSTRACT

The present invention is directed to apparatus for automatically fabricating environmental seed cells, e.g. tablets incorporating two or more layers of material which will protect the seed during transportation and facilitate its growth after the same is planted, the apparatus including a tableting machine for feeding the environmental surround material into compression mold cavities, a singulator mechanism whereby individual seeds are separated from a bulk supply, and transfer mechanism for receiving separated seeds from the singulator and depositing them in the molds of the tableting machine. After loading, the aggregate comprising the environmental material and seed are subjected to compression, to produce the finished environmental seed cell.

6 Claims, 18 Drawing Figures

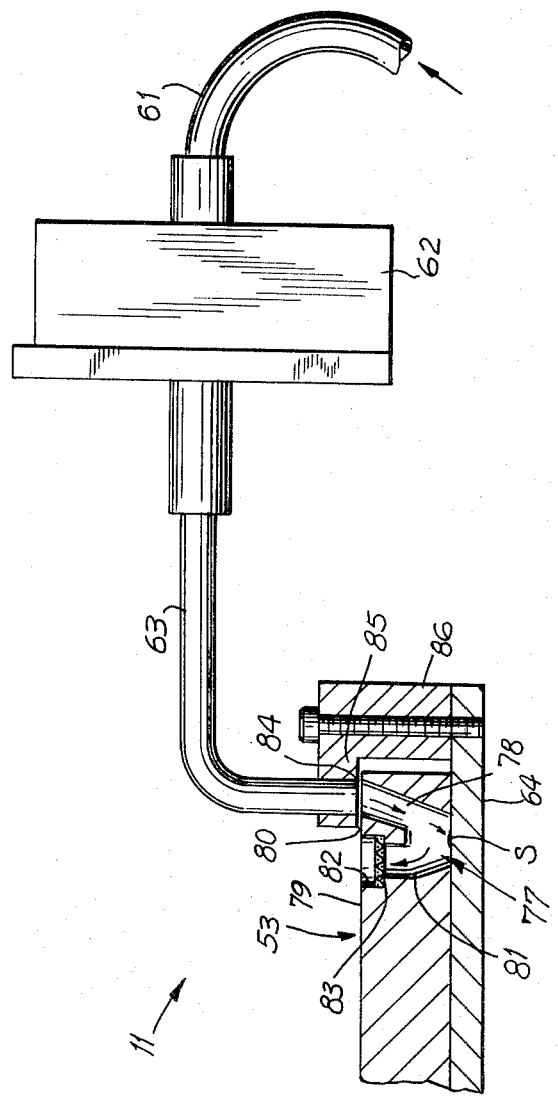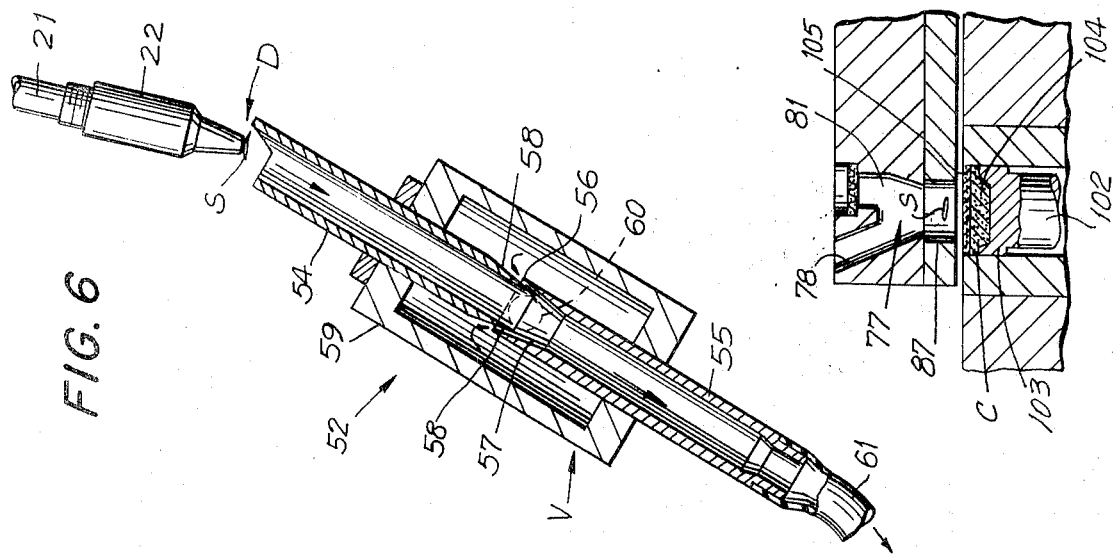

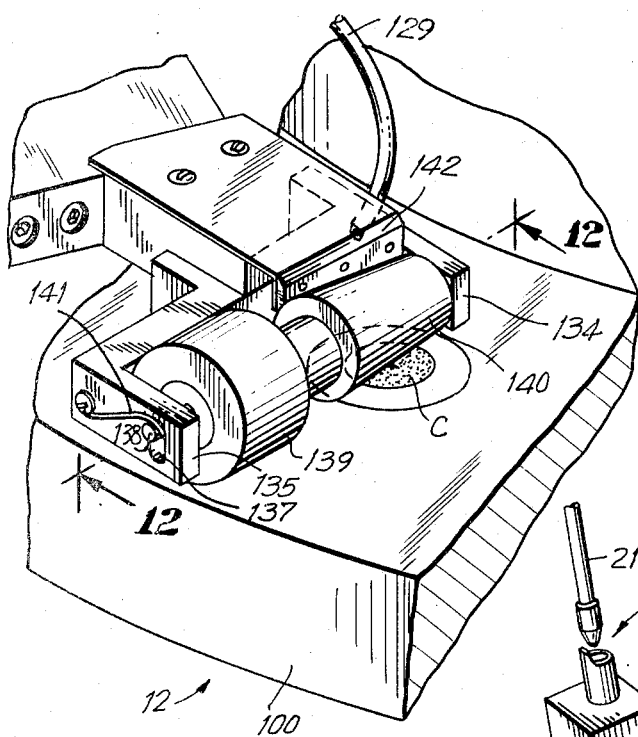
FIG. 11
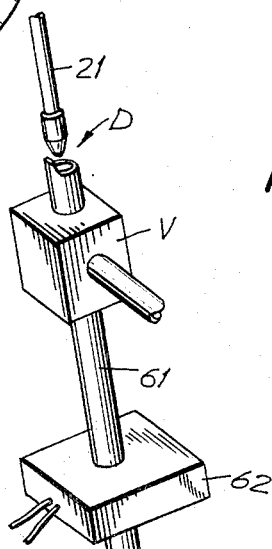
FIG. 17
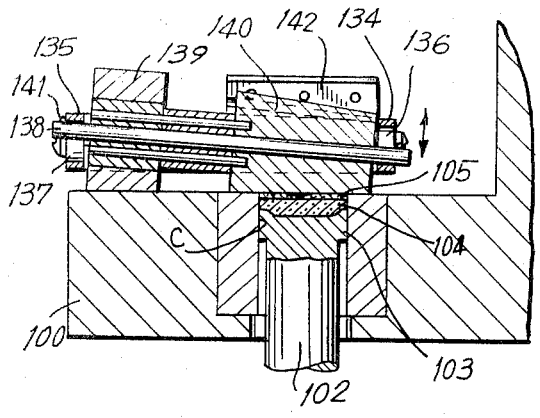
FIG. 12
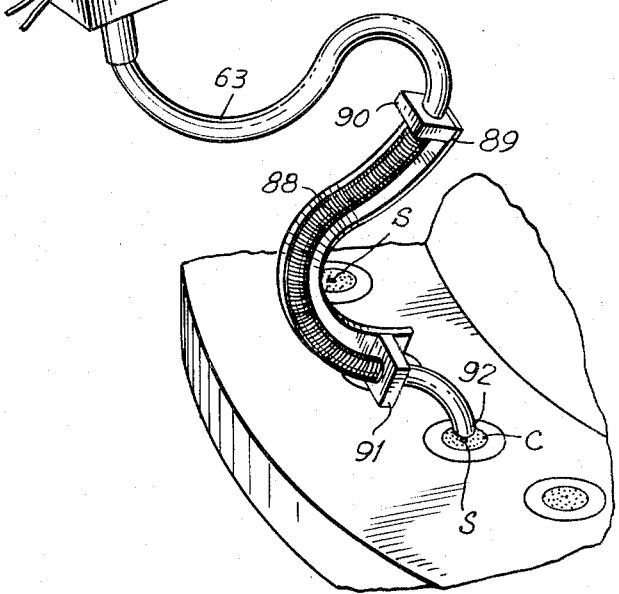

APPARATUS FOR MANUFACTURING ENVIRONMENTAL SEED CELLS

BACKGROUND OF THE INVENTION

1. Field of the Invention

The present invention is in the field of improved automated apparatus for the manufacture of environmental seed cells wherein the entirety of the steps necessary for the fabrication of such cells, namely, selection of individual seeds from a bulk supply, loading of individual seeds into the compression mold cavities of a tableting apparatus and filling of the mold cavities with appropriate types and quantities of protective-environmental material, are effected with a minimum of supervision.

2. The Prior Art

The present invention is directed particularly to an apparatus constituting an improvement of the apparatus disclosed in U.S. Pat. No. 3,640,428.

As conducive to an understanding of the present invention, it should be noted that in order to secure optimum yield per acre of plants grown from seed and especially certain difficulty handled seeds, by way of example, lettuce, there is an increasing trend toward the employment of environmental seed cells comprising a single seed disposed within a protective mass of encapsulating material which also facilitates germination and growth of the seedling. The utilization of environmental seed cells produces further economies by enabling the seeds to be planted at ideal spacings or intervals, eliminating the necessity for time consuming thinning operations.

In contrast to the larger and, hence, readily handled seed cells, individual seeds, e. g. lettuce, cannot be planted in precisely spaced relation, necessitating under-planting, with consequent waste of space, or over-planting and subsequent thinning.

The advantages of environmental seed cells having been fully outlined in U.S. Pat. No. 3,690,034, they need not be further discussed herein.

The fabrication of such cells, however, and particularly the fabrication in an efficient and highly automated manner, present unique difficulties. By way of example, it is highly desirable that each environmental cell contain one, and only one, seed, or else optimum spacing cannot be achieved. Further, the seeds typically employed are extremely small, increasing the difficulty of automatically selecting a single seed from a bulk mass and depositing the single seed in the cell forming equipment.

A further difficulty inhering in the fabrication of environmental seed cells lies in the fact that many of the preferred materials employed as blanketing or protective layers for the seed (see U.S. Pat. No. 3,690,034) are extremely difficult to handle, measure, feed and process. For instance, a preferred form of environmental seed cell will include outer layers comprised largely of vermiculite and inner layers or blankets comprised of a material having extremely small particle size, such as finely ground "Sorbitol." As is well known, vermiculite is an extremely low density material having a relatively large particle size per unit density, whereby feeding of the material in precise quantities is a difficult undertaking. Similarly, "Sorbitol," when milled to small particle size, is a fluffy material, subject to scattering when exposed to turbulent conditions, etc.

While the art of forming tablets from pulverulent material is a well developed one, the tableting of such materials as are preferably employed in the formation of environmental seed cells will be seen to present unique problems. Similarly, the selection from a bulk supply, transferring and positioning of articles as small and light as seed, by automated means, present special difficulties.

SUMMARY OF THE INVENTION

The present invention may be summarized as directed to an apparatus for the formation of environmental seed cells.

The invention is further directed to apparatus of the type described which is automated, and requires only occasional attention on the part of operating personnel.

The invention contemplates the provision of a combination apparatus performing the functions of (1) selecting a single seed from a mass of such seeds; (2) advancing the seed without injuring the same, and depositing the advanced seed in a predetermined position within a compression mold, without disorienting material already positioned in the mold, and (3) supplying the surround layers of material and compacting the same to form a coherent environmental seed cell.

More particularly, in accordance with the invention, there is provided a singulator apparatus including a multiplicity of fingers adapted cyclically to pass through a bulk mass of seeds, the fingers being hollow and communicated with a source of vacuum throughout substantially the entirety of an operating cycle. The terminal ends of the fingers are sized to permit but a single seed to be supported at their tips, the seed being maintained in such position by the sub-atmospheric pressure within the fingers. In order to assure against the inadvertent attachment of two or more seeds on any one finger, and consequent formation of a seed cell containing two seeds, means are provided for vibrating or oscillating the fingers transversely as respects their longitudinal axis, whereby any surplus and, hence, insecurely supported seeds are removed from the fingers. The fingers are passed over a discharge station whereat the internal bore is connected to a super-atmospheric pressure, causing the single supported seed to be discharged.

A conduit, preferably operating on a Venturi principle, receives the seeds, advancing them past a detection station, which functions to confirm that a single seed only has been discharged by each finger. The seeds are advanced to transfer apparatus coordinated with a tableting apparatus, individual seeds being deposited into each mold cavity of the tableting apparatus, such cavities having already been filled with one or more layers of environmental surround material.

The tableting apparatus includes feed chutes for filling the mold cavities with the requisite material, the apparatus incorporating mechanism assuring a continuous flow or supply of materials to, and filling of, the cavities.

After reception of the seed, the mold volume is increased by movement of a mold boundary defining wall to permit the reception of additional quantities of environmental material above the seed, the fluid cavities thereafter being subjected to compression, resulting in the formation of a coherent environmental seed cell.

With the foregoing in mind, it is an object of the invention to provide apparatus adapted for forming environmental seed cells.

It is a further object of the invention to provide automated apparatus which is an improvement of the apparatus disclosed in U.S. Pat. No. 3,640,428.

It is still a further object of the invention to provide apparatus of the type described, including singulator means which selects single seeds from a bulk supply, transfer means for accepting the singulated seeds and depositing them in a tablet forming means which is actuated to charge selected amounts of environmental material above and below the seed and subject the composite to compression, thus to form an environmental seed cell.

Still a further object of the invention is the provision, in combination with singulator and tableting apparatus, of an improved transfer mechanism for feeding individual seeds to the partially filed mold cavities of the tableting apparatus without disturbing the uncompacted materials already in the cavities.

It is still a further object of the invention to provide, in combination with singulator and transfer apparatus, tableting apparatus having novel means for assuring continuous feed to the mold cavities of light weight and, hence, difficultly handled environmental cell materials, particularly vermiculite.

Still a further object of the invention is the provision in an apparatus of the class described of a conduit mechanism operating on a Venturi principle, the entrance end of the conduit being at sub-atmospheric pressure, to facilitate the introduction of the seed into the conduit, the seed being advanced by the air pressure employed to induce the sub-atmospheric pressure.

Still a further object of the invention is the provision of an improved form of conduit type transfer mechanism in combination with an apparatus of the type described whereby a seed or the like deposited in an entrance end of the conduit is advanced in an air stream and discharged at the exit end, the conduit including means for dissipating the air stream so that the seed emerges clear of surrounding turbulence effects which would scatter the environmental materials adjacent the exit.

To attain these objects and such further objects as may appear herein or be hereinafter pointed out, reference is made to the accompanying drawings, forming a part hereof, in which:

FIG. 6 is a magnified vertical section taken on the line 6—6 of FIG. 3;

FIG. 7 is a fragmentary magnified vertical section taken on the line 7—7 of FIG. 3;

FIG. 11 is a fragmentary perspective view of the material leveler device;

FIG. 12 is a vertical section taken on the line 12—12 of FIG. 11;

FIG. 17 is a fragmentary perspective view showing a modified embodiment of a seed transfer mechanism;

Figure 1:
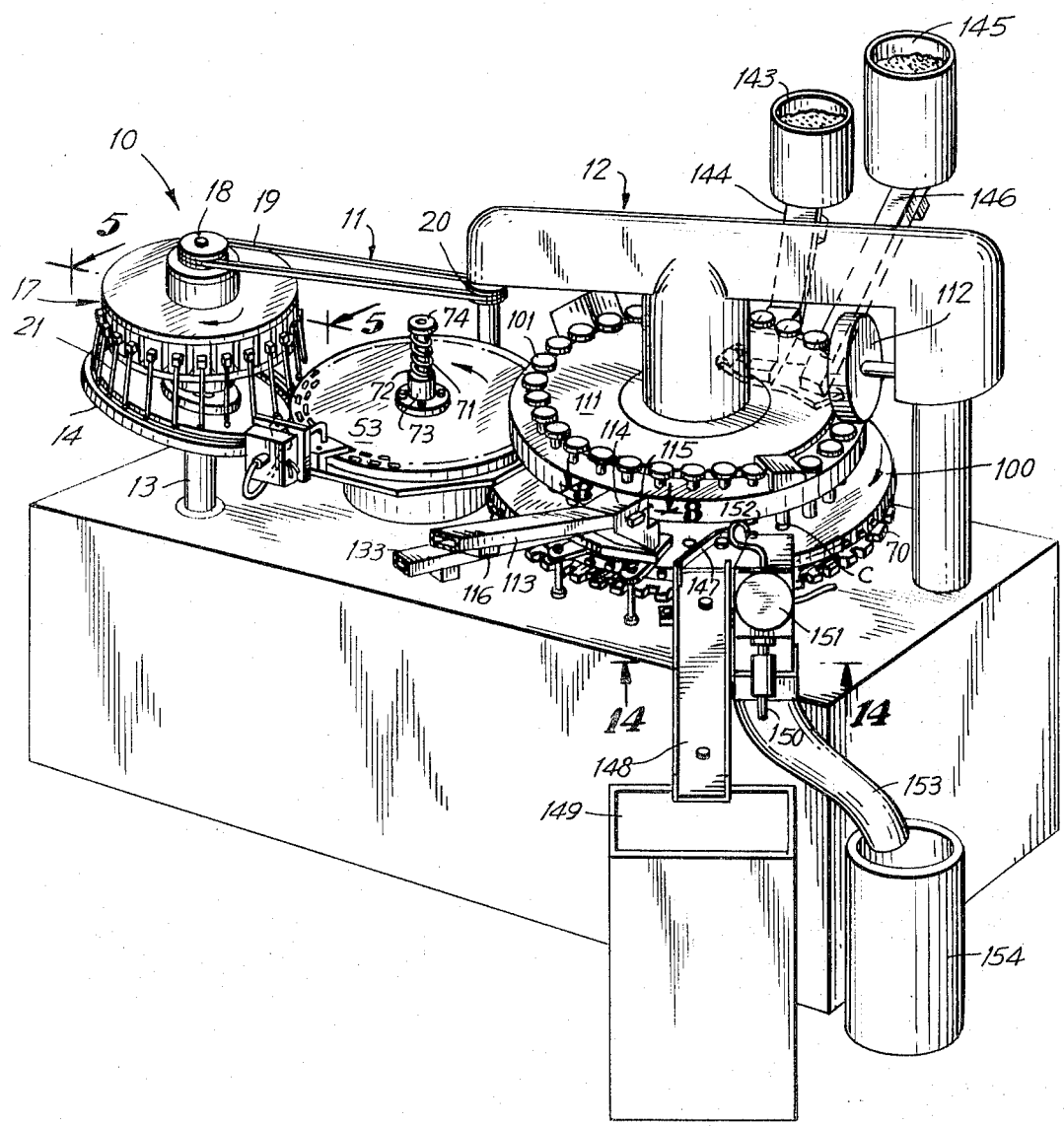
FIG. 1 is a perspective view of an environmental seed forming machine in accordance with the invention.

Referring now to the drawings, there is shown in FIG. 1 an environmental seed forming apparatus for fabricating seeds of the type disclosed in U.S. Pat. No. 3,690,034. The composite apparatus may be described as incorporating parts including a seed singulator section 10, transfer mechanism 11 and a tablet forming section 12.

The tablet forming mechanism is, by and large, conventional, with the exception of certain elements for filling and leveling the mold cavities as hereinafter more specifically described.

In order to simplify an understanding of the ensuing description, it should be recognized that the function of the singulating mechanism 10 is to extract individual seeds from a bulk supply and deposit the extracted seeds in the transfer mechanism 11. The function of the transfer mechanism 11 is to position the individual, singulated seeds into the mold cavities of the tableting mechanism 12, the latter functioning to encapsulate the seed within two or more layers of surrounding environmental material, and to apply pressure to the composite to form the same into a tablet or environmental seed cell.

SINGULATING MECHANISM

Turning first to the singulating mechanism, which is best shown in FIGS. 1 to 5, there is disclosed a vertical shaft 13 upon which is mounted a rotatable distributor tray member 14, the tray member being angularly oriented relative to the shaft 13. The tray 14 includes an annular seed receiver channel 15, which may be charged either manually or automatically so as to maintain an essentially constant bulk supply of seeds. The tray assembly 14 may include bearings 16, including an inner race 16' fixed to the shaft and an outer race 16" fixed to the tray. Seeds S are picked up from the tray assembly by a turret singulator assembly 17 next to be described.

The turret assembly is powered by a drive belt 19 which operatively links pulley 18 of the turret with a pulley 20 forming a part of the tableting mechanism.

The belt 19, through its engagement with pulley 18, drives the turret 17 in a clockwise direction as viewed in FIG. 1. The turret carries a plurality of seed pick-up fingers 21. The fingers are scanned through the mass of seeds in the annular receiver channel 15, the fingers 21 being hollow and presenting a vacuum at the nozzle or tip 22, the tip or nozzle being so dimensioned as to accept and retain only a single seed at a time.

It will be appreciated that the seeds carried by the fingers 21 are dropped at a discharge station D leading to the transfer mechanism, a vacuum or negative pressure being maintained within the fingers until the same are aligned with the discharge station D, at which position air under pressure is admitted to the fingers, forcibly discharging the seeds.

The pick-up and discharge mechanism is essentially similar to that described in my U.S. Pat. No. 3,640,428 and, accordingly, a detailed description need not be here repeated, it being sufficient to note that the space 23 defined between upper and lower plates 24, 25 of the turret comprises a pressure manifold connected through aperture 26 to a source of air under pressure. In similar fashion, a vacuum manifold is defined between upper and lower plates 28, 29, respectively, the source of vacuum being admitted to the space through aperture 30.

Each of the fingers 21 includes at its upper end a nipple 31 threaded into a block 32 fixed to the outer periphery 33 of the turret. A through-bore 34 formed in the turret leads to the interior of the blocks 32, nipples 31 and the hollow fingers 21. Valve stems or spools 35 are radially shifatbly mounted within enlarged bore portions 36 leading to bores 34.

The spools 35 include a central passage 37 and a radially directed communicating port 38. As best seen from an inspection of FIG. 5, when a spool 35 is in its radial outermost position, the port 38 is communicated with a passageway 39 connected to the pressure manifold 23, whereat air pressure from the manifold is permitted to flow through the passage 39, port 38, bore 37 and into the interior of the finger 21, forcibly to eject a seed supported at the tip or nozzle 22 of the finger.

As in the above noted U.S. Pat. No. 3,640,428, the spools 35 are normally maintained in their radially inwardly shifted position by springs 40, bearing at their radial inner ends against head portion 41 fastened to the spools, the radial outer ends of the springs 40 bearing against an inner periphery portion 42 of the turret—see righthandmost valve structure, FIG. 5.

Figure 5:
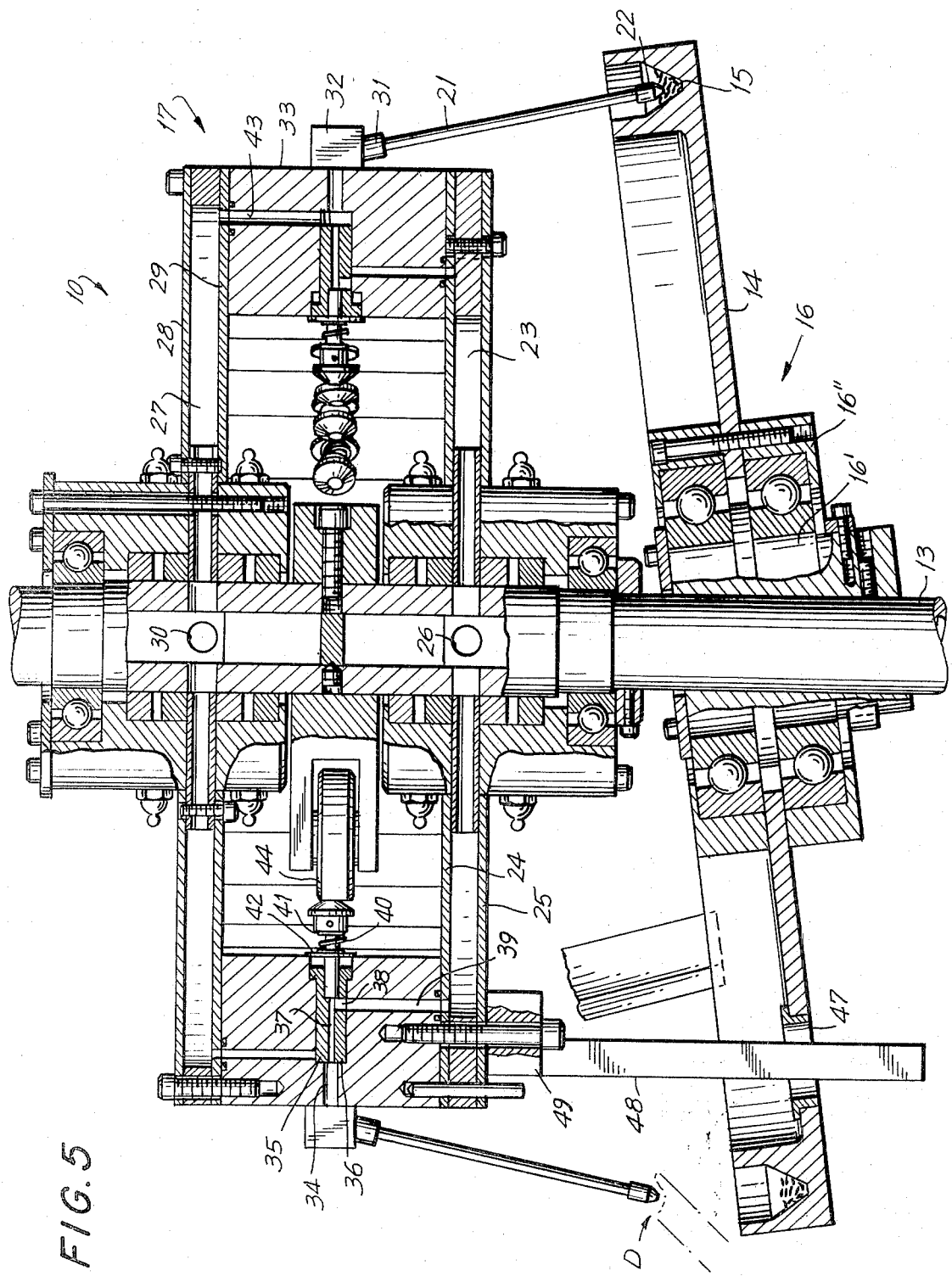
FIG. 5 is a magnified vertical sectional view taken along the line 5—5 of FIG. 1.

As will be seen from an inspection of the noted portion of FIG. 5, the vacuum in the manifold 27 is communicated to the bore of the fingers 21 through the depending passageway 43 into the enlarged bore chamber 36 forwardly of the forwardmost end of the spool or valve stem 35.

From the above description it will be perceived that there is normally a vacuum or negative pressure as compared with atmospheric in the bores of the fingers 21 and, hence, at the nozzle 22, throughout all movement of the fingers except when the same reach the position of the lefthandmost finger, as shown in FIG. 5, i.e., at the discharge station D. At such position there is located a cam wheel 44 which engages against the head 41, shifting the position of the spool in a radial outward direction against the biasing force of the spring 40, temporarily connecting the interior of the finger 21, in the manner aforesaid, with the pressure manifold 23.

It will thus be appreciated that as the nozzles 22 of the fingers are scanned through the bulk seed supply, a single seed will be picked up by the tip of the nozzle, the size of the exit aperture in the nozzle being coordinated with the size of seed employed in such manner that it will be unlikely that two or more seeds may be supported on any nozzle tip.

Figure 2:
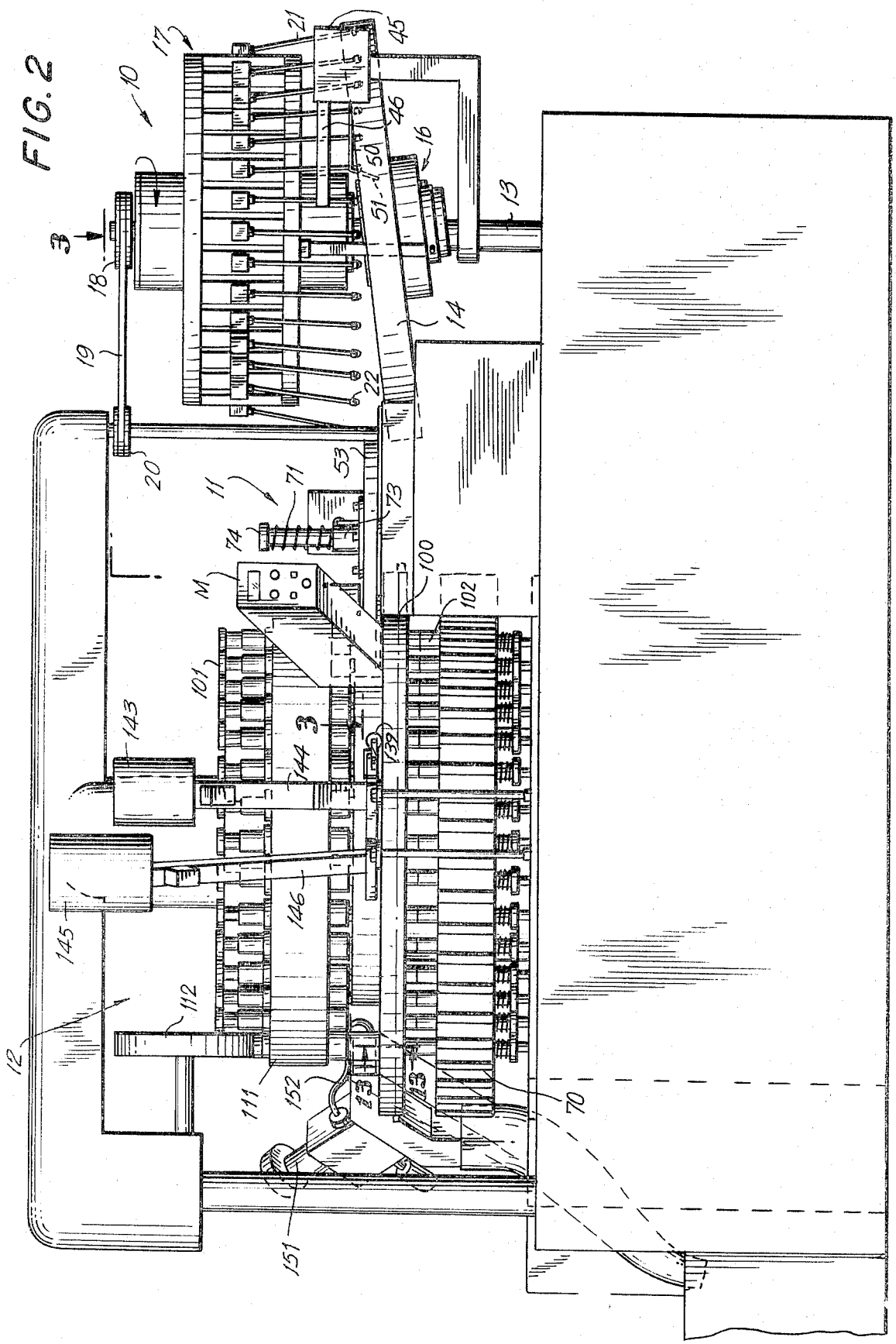
FIG. 2 is a side elevational view, on a larger scale, of the opposite side from that shown in FIG. 1.

In order further to insure against the possibility of multiple seeds being carried and simultaneously discharged at the discharge station D, there is provided a vibrator assembly 45, FIG. 2, which may comprise an electrically or electronically oscillated mechanism for inducing transverse vibrations in yieldable blade spring 46. The blade spring 46 extends into the path of, and bears against, the fingers 21 as they are rotated toward the discharge station, the combination of impact of spring against the fingers plus the vibratory motion of the spring under the influence of the vibrator 45 inducing an oscillation of the fingers whereby any seeds in excess of a single seed will be shaken free of the nozzles. Preferably, the cantilevered construction of the fingers per se allows the same to vibrate, augmenting the likelihood that any excessive seeds will be removed from the nozzle.

It will be appreciated that rotation of the distributor tray 14 is effected by a driving connection between the turret assembly 17 and tray 14. For this purpose, a vertically directed drive aperture 47 is formed in the tray. A drive lug 48, made fast at its upper end 49 to the plate 25 of the turret, extends through the drive aperture 47, thus to cause the tray to rotate in accordance with the rotative speed of the turret.

Preferably an agitator finger 50, fixed relative to the rotating tray, may include a tip portion 51 disposed within the channel 15 to agitate and circulate the seeds in accordance with the movement of the tray, the seeds also being tumbled and agitated by the rotation of the inclined tray.

From the foregoing it will be appreciated that the singulator mechanism is effective to select individual seeds from a bulk supply and release the seeds at the discharge station D, leading to a subsequent stage of operation, the apparatus reducing to a minimum the possibility of more than a single seed or no seed at all being deposited at the station. Moreover, since the singulating apparatus is driven by a power take-off from the tableting mechanism proper, the rate of seed deposit is precisely coordinated with the operation of the tableting mechanism.

TRANSFER MECHANISM

The transfer mechanism, which functions to receive individual seeds released at the discharge station D and introduce the seeds into partially filled mold cavities of the tableting mechanism, will now be described.

The actual shifting of the seed is preferably effected in part by a conveyor mechanism 52 which picks the seed from the discharge station D and advances the same to a transfer wheel or disk 53. Optionally but preferably, the conveyor operates on a Venturi principle whereby a given air supply induces a subatmospheric pressure at the delivery or introduction end D so as to assure the seed entering the mechanism, and also advances the seed from the conveyor and preferably through a detection station to the transfer plate or disk 53.

The Venturi assembly V (FIG. 6) includes an input tube 54 and an output tube 55, the lowermost or terminal end 56 of the tube 54 being disposed in slightly telescoped relation within the upper terminal end 57 of the tube 55. Preferably a chamfer or inward taper is defined in the interior of the upper end of the tube 55, the lower end 56 of the upper tube 54 having a corresponding inward streamlining or taper in the direction of air travel, whereby there is defined between the ends 56 and 57 an annular, inclined space 58, the inclination being in the direction of flow within the conduit and toward the central axis of the tube 55.

The junction of the tubes 54 and 55 is contained within a housing 59. An air inlet 60 (dotted lines, FIG. 6, and solid lines, FIG. 4) is connected to the housing 59, the location of the inlet being just below the upper edge of the lower tube 55.

From the foregoing arrangement it will be evident that when air under pressure is admitted through the inlet 60 to the housing 59, there is created by the Venturi arrangement a suction at the delivery point D which will induce a discharged seed S to travel through the conduit 54, the air flow through the annular space 58 accelerating the seed and speeding its journey to the transfer mechanism. It will thus be seen that a single air inlet produces a suction to gather seeds at the inlet end and, in addition, accelerates the seeds to a selected delivery point.

Optionally and preferably the tube 55 leads to a flexible conduit 61 extending to a detector station 62. It is the function of the detector station to determine during each cycle of operation whether a single seed has passed from the conduit 61 to the deposit tube 63 and to store information in the event of detection of an improper feed, i.e., in the event that no seed has been deposited, or in the event that more than a single seed has been deposited.

It will be appreciated that the detector, upon sensing an improper feed cycle, will energize a memory circuit adapted to trigger a take-off apparatus located at a terminal end of the tableting machine and to discharge into a container the defective tablet formed as a result of the improper feed cycle. The reject mechanism for separating improper tablets which is triggered from the memory circuit will be discussed in connection with the description of the tableting apparatus.

Figure 18:
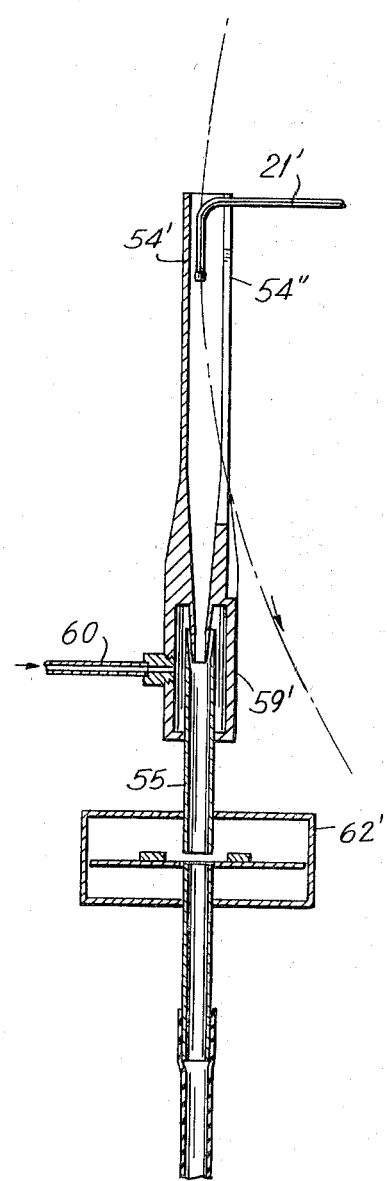
FIG. 18 is a fragmentary cross sectional view of a further embodiment of a component of a seed transfer mechanism in accordance with the invention.

FIG. 18 discloses a modified Venturi apparatus intended to be used with a turret rotating about a horizontal axis wherein fingers 21' are shifted in an essentially vertical plane.

In the embodiment of FIG. 18, the singulator fingers 21' describe an arcuate path, shown in dot and dash lines in the said figure.

In accordance with this embodiment the Venturi input tube 54' is provided with a vertically directed clearance slot 54'', permitting the passage of the fingers 21'.

It will be appreciated that in the noted embodiment, air admitted through the passage 60' enters the housing 59', drawing the seed from the tube 54' into the lower conduit 55'. A detector 62', similar to the prior described detector and which includes photoelectric or like detecting means, is positioned to sense the seeds emerging from the lower conduit 55'.

It will be understood that the seeds passing the detector to the deposit tube 63 will have a substantial velocity. Additionally, the same will be entrained in a rapidly moving air stream. If the same were merely deposited in an aperture in a plate or the like, it has been determined that there would be a substantial incidence of seed loss by reason of the combined effect of the resilient bouncing of the seeds from the tray, magnified by the effects of the air stream.

With the foregoing in mind, seed loss is eliminated by the distributor assembly which includes the rotatable transfer plate 53 mounted above a nesting plate or table 64 defining a floor for the plate 53.

Figure 4:
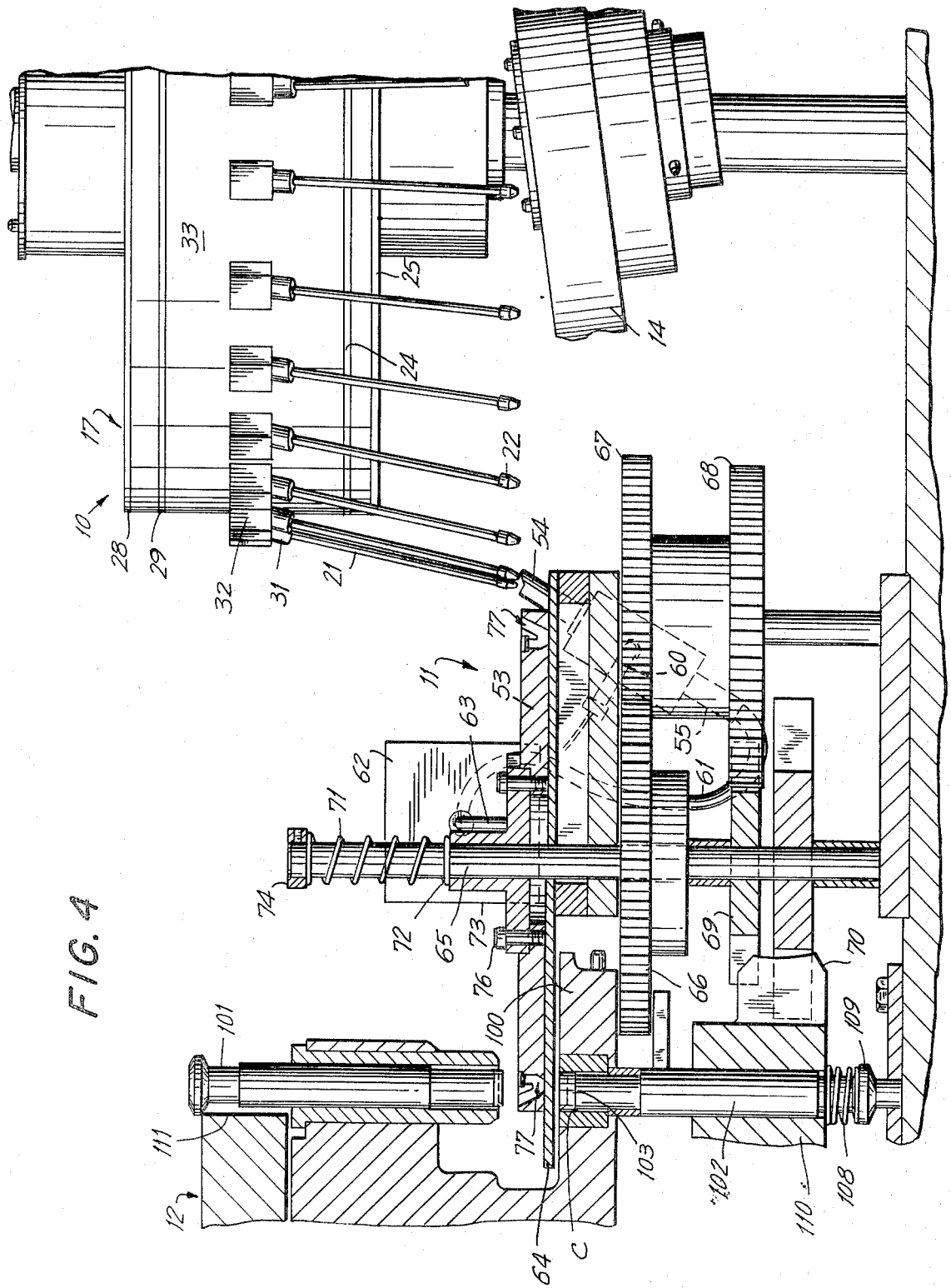
FIG. 4 is a vertical sectional view taken generally along the line 4—4 of FIG. 3.

The transfer plate 53 is driven by a shaft member 65, FIG. 4, carrying a gear 66 which is, in turn, driven by a suitable gear train including as elements thereof gears 67, 68, 69, the last mentioned gear being powered by a take-off or timer gear mechanism 70 fixed to the tableting apparatus. The transfer wheel or distributor plate 53 is passed against the nesting plate or table 64 by a coil spring 71, the lower end 72 of which is biased against the collar 73 fastened to the plate, the upper end of the spring 71 being biased against a cap 74 carried by the shaft 65.

A degree of angular adjustment between the plate 53 and shaft 65 is provided by the connection between the collar 73 and plate 53 by a series of arcuate slots 75 through which machine screws 76 are passed, the screws being threaded into the disk 53.

Pockets 77 defined in the disk 53 may be angularly adjusted in such manner as to coordinate the disposition of the said pockets with the mold cavities of the tableting mechanism, by angularly adjusting the plate 53 within the range of relative movements provided by the arcuate slots.

The receiver pockets 77 of the distributor plate form repositories into which the seeds are sequentially introduced from the conduit 63. The pockets include an inclined entrance channel portion 78 extending downwardly from the top surface 79 of the plate 53, the upper ends 80 of the channels 78 being aligned in an arcuate row. Optionally and preferably, the upper portions 80 are elongated in an arcuate direction.

The pockets 77 include vent channels 81 extending upwardly toward and venting at the upper surface 79 of the plate 53 at vent openings 82. Screen members 83 are disposed adjacent the upper end of the vent channels 81, the screens being of a size to prevent the passage therebeyond of seeds, while permitting free outflow of the air stream within which the seeds are entrained.

Figure 3:
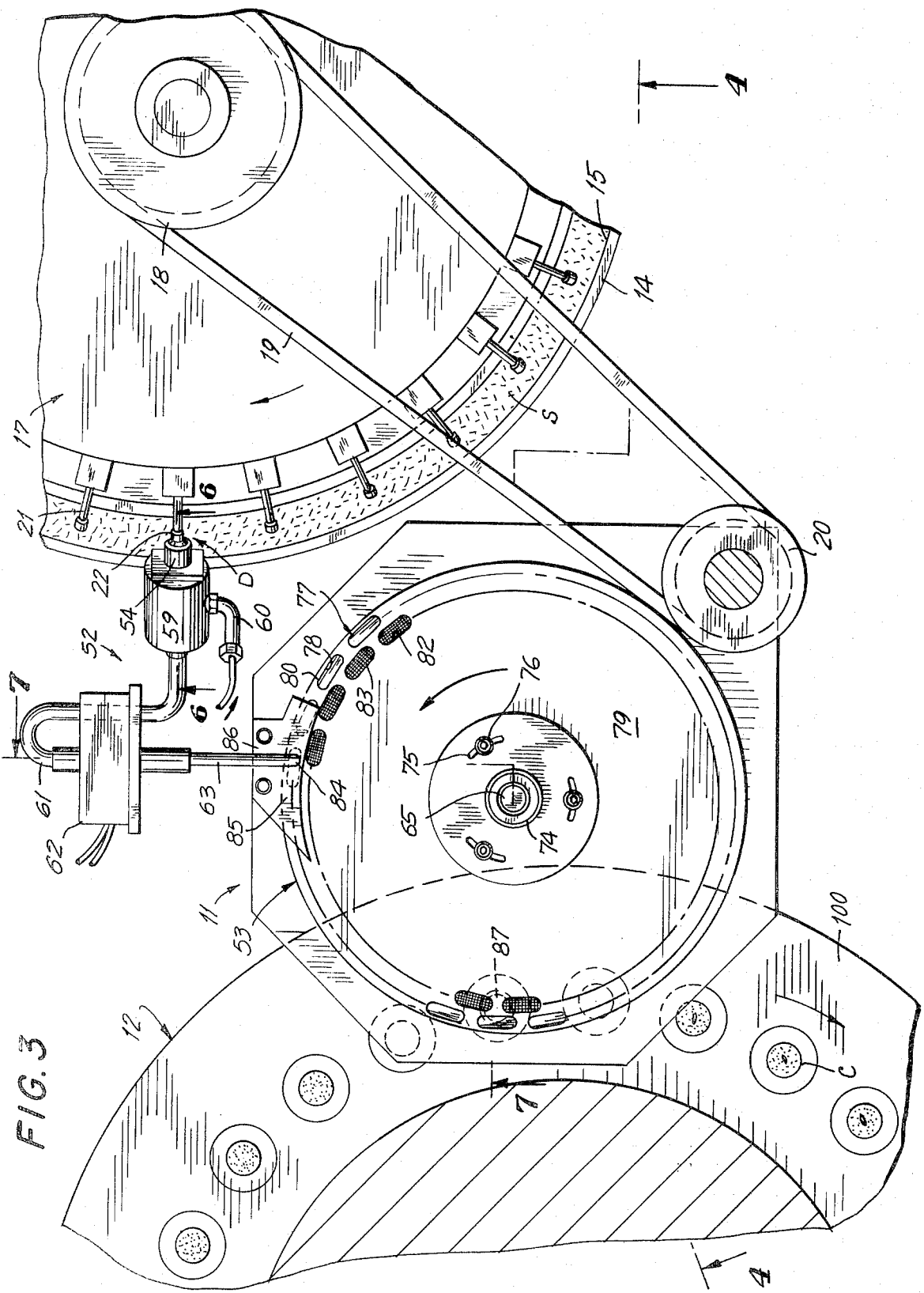
FIG. 3 is a cross sectional view taken generally along the line 3—3 of FIG. 2.

The seeds are fed to the plate 53 at a receiver station defined at the lowermost terminal end 84 of the conduit 63. The end 84, as best seen in FIGS. 3 and 7, is secured to a flange 85 formed on bracket 86. The bracket 86 is disposed adjacent the periphery of the disk 53 with the flange 85 overlying the row defined by the uppermost ends 80 of the input channels 78.

The operation of the device is coordinated in such manner that a seed is discharged through conduit 63, emerging from the lower end 84 thereof as the opening 80 of each pocket 77 is aligned beneath the exit 84 of the seed discharge.

It will thus be evident that as each pocket is aligned with the discharge, a seed S will be ejected into the pocket but will be prevented from bouncing clear of the pocket, the vent channel providing egress for the air within which the seed S is entrained. The flange 85 which overlies substantially the entirety of the upper edges 80 of the pockets likewise prevents the inadvertent egress of the seed from the disk.

As the disk is rotated, the seeds S rest on the floor or nesting plate 64 and are carried by the rotating pockets in an arcuate path until the same are aligned with discharge aperture 87 in the plate 64. The discharge aperture 87 is disposed in registry with the path traversed by the lower mold cavities, whereupon each successive seed is dropped into a registering and partly filled mold cavity C of the tableting mechanism.

Thus, it will be observed that the transfer mechanism 11 functions to receive the singulated seeds and gently deposit the same into partially filled mold cavities of the tableting apparatus. The importance of a gentle deposit of the seeds may be appreciated from the fact that the mold cavities are preferably filled with a light weight material or materials including, by way of example, vermiculite, finely ground Sorbitol, etc., as set forth in U.S. Pat. No. 3,690,034, which describes in detail the environmental seed cell. In the event of any air currents at the point of deposit, it will be readily recognized that the light weight material charged into the mold cavity would become scattered.

In FIG. 17 there is shown an alternative transfer mechanism, which likewise functions to receive singulated seeds and deposit the same in the partially filled mold cavities C.

In accordance with the embodiment of FIG. 17, the fingers 21 deposit the seeds S in a delivery station D whereat a Venturi assembly V accelerates the seeds through delivery conduit 61 beyond detector station 62 and deposits them in tube 63. It will be appreciated that the seeds S in the tube 63 are entrained in a rapidly moving air stream and that if the stream and seeds were impinged against the partly filled mold cavitie C, the mold contents, as previously noted, would be scattered. In order to deliver seeds S at a desired velocity and to dissipate the air stream there is provided a curved conduit member 88 which optionally but preferably comprises a helical spring member. The convolutions of the spring 88 are wound such that they define a continuous tubular member in the straight condition of the spring. The spring is curved to a compound configuration, the same being maintained in the desired curvature by a rigid member 89 having an input support bracket 90 and an output support bracket 91, holding the input and output ends of the spring, respectively. The curvature imparted to the spring functions to open bleed apertures between the helical convolutions defining the spring.

It is the tendency of the air stream to continue in a straight line, and where the spring is curved, the combination of the straight line tendency of the air stream plus the bleed apertures defined between convolutions of the spring tends to cause the air to pass outwardly from the convolutions. It will be understood that, if necessary, multiple curvatures may be induced in the spring. The seed, however, will retain the initial velocity imparted to it by reason of its greater weight and, thus, the seed S will be delivered at the terminal end 92 substantially unaccompanied by air turbulence sufficient to disturb the contents of the cavities C.

TABLETING MECHANISM

The tableting mechanism 12, except for the modifications hereinafter more specifically described, may comprise an essentially conventional unit generally along the lines of U.S. Pat. No. 2,109,407, and incorporating a series of compression mold cavities having upper and lower punches or plungers which function, after the appropriate materials are charged into the cavities, to compress the materials whereby to define a tablet. Accordingly, details of the construction of the tableting machine will be described only to the extent necessary for an understanding of the invention, it being appreciated that a similar tableting mechanism having compression molds mounted on an apparatus rotated about a horizontal axis rather than about the vertical axis, in accordance with the present apparatus, is described in my aforesaid U.S. Pat. No. 3,640,428.

The tableting apparatus includes a cavity disk 100. The disk includes a multiplicity of cavities C for receiving the various materials to be compressed into the finished environmental seed cell.

The disk 100 is fixed to a shaft which drives the disk and associated set of upper plungers 101 and lower plungers 102. It will be understood that the floor of each of the cavities is defined by the upper end 103 of the lower plungers, the lower plungers being shiftable within the cavities C so as to provide room for the introduction of selected volumes of materials to be compressed. It will be understood that the depth of the cavities is a function of the position of the lowermost plungers within the cavities; that the plungers, for initial fill, are depressed within the cavities to a selected extent; that a charge of material, such as vermiculite, is introduced into the cavities; that after introduction of an initial charge the plunger may be lowered further within the cavities to provide room for additional materials.

Figure 13:
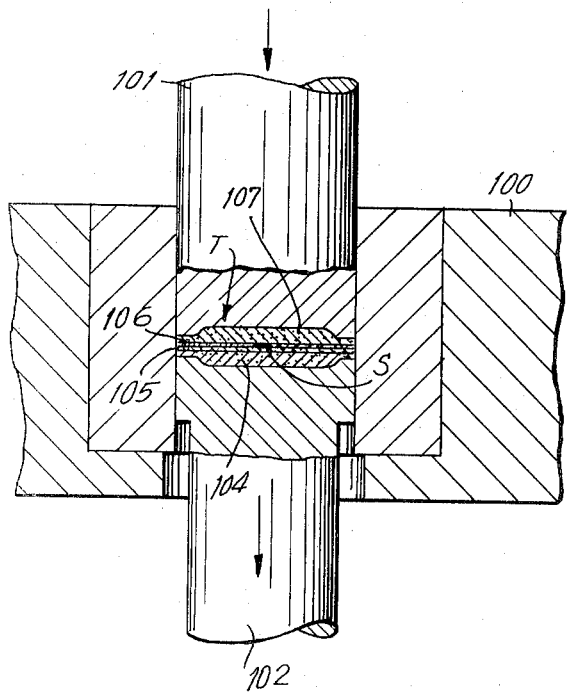
FIG. 13 is a fragmentary sectional view of tablet compressing elements.

In the preferred environmental seed cell as shown in FIG. 13, there are four distinct layers of material, notably a lowermost vermiculite layer 104, a secondary layer 105, such as a layer of finely milled Sorbitol on which the seed S is deposited, a secondary layer 106 of cushioning Sorbitol, and a final layer 107 of vermiculite.

The lower plungers 102 are depressed by the apparatus of the tableting machine to a first extent to receive the initial charge of vermiculite; are subsequently lowered to a slight degree to receive the first Sorbitol or cushioning layer 105; are further depressed after addition of the seed to provide room for a further cushioning layer 106 of Sorbitol; and are still further depressed to receive the final vermiculite layer 107.

It will be understood that at this stage of the operation, as is conventional in tableting machines, the upper series of plungers 101 are introduced into the mold cavities, the plungers 101 and 102 being shifted toward each other to a predetermined extent to exert the necessary compressive forces to form the initially flat layers of added material into the shaped environmental cell which forms the subject-matter of U.S. Pat. No. 3,690,034.

As is usual, a full molding cycle is defined by a single complete rotation of the cavity plate 100, certain of the cavities being loaded as other of the cavities are being subjected to compressive forces.

It will be further understood that the movement of the lower plungers 102 is preferably controlled by a cam track (not shown) which raises and lowers the plungers in accordance with the desired position within the mold cavity, the plungers being normally biased outwardly or downwardly relatively to the cavities of the coil springs 108 interposed between the heads 109 of the plungers 102 and the timing wheel 110.

The movement of the upper plungers 101 is controlled by a cam track 111 until the final compression stages, whereat a rotary pressure cam 112 functions serially to drive the upper plungers into the cavities and define the finished environmental seed cells.

The cavities, as noted previously, are filled serially, the first filler layer preferably comprising a blanket or protective layer, such as vermiculite.

Referring to FIG. 1, 113 comprises a chute leading to the cavities from a storage hopper member (not shown) within which a bulk supply of vermiculite is maintained. The cavity disk 100, as it approaches the initial vermiculite filling station, will have the lower plungers partially withdrawn within the cavities to define a volume to be filled with an appropriate quantity of vermiculite. The vermiculite material is exceedingly difficult to feed and control, and it is important to the proper fabrication of the environmental cells that the cavities be charged with a selected amount of the material and that there be no voids or empty spaces.

Figure 9:
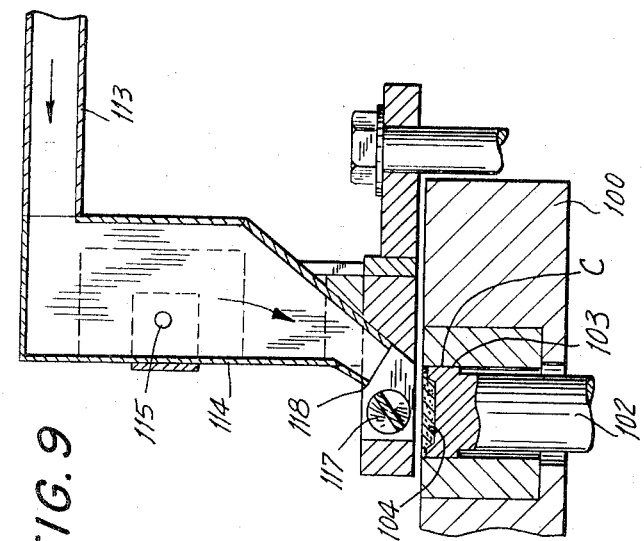
FIG. 9 is a vertical section taken along the line 9—9 of FIG. 8.
Figure 10:
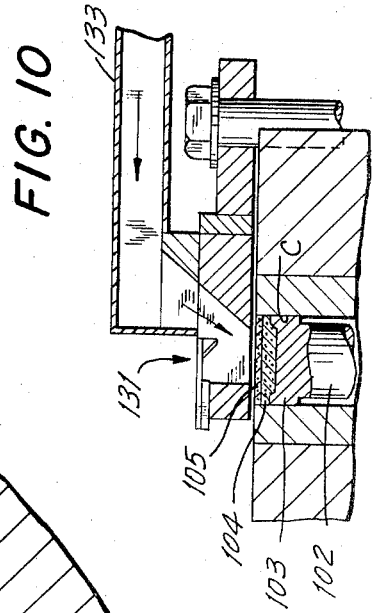
FIG. 10 is a vertical section taken along the line 10—10 of FIG. 8.
Figure 8:
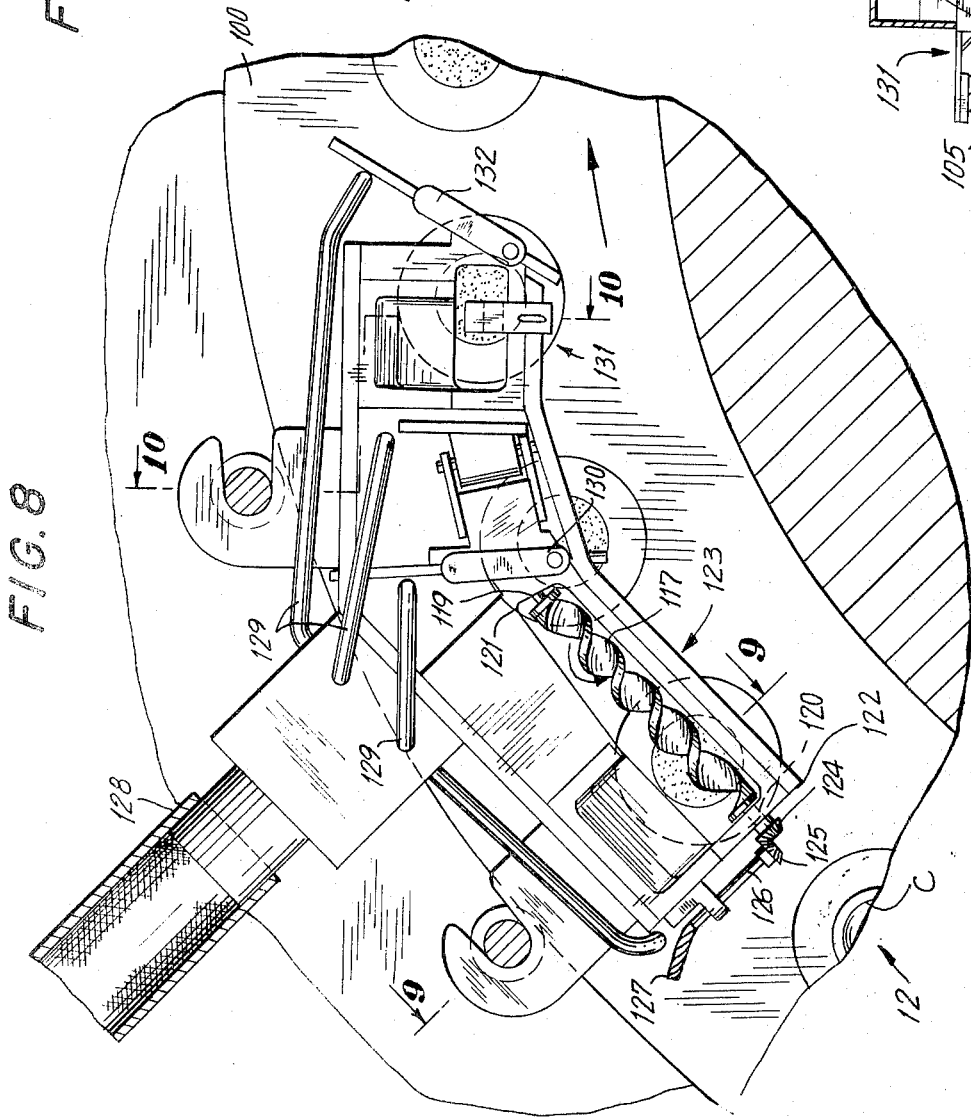
FIG. 8 is a magnified fragmentary top plan view of the filling station.

In order to assure proper feed, there is shown in FIGS. 8 and 9 apparatus for charging the initial layer into the mold cavities. The chute 113 leads into a lower chamber 114 incorporating a photoelectric cell 115. In order to assure a continuous supply of vermiculite in the lower chamber, a source of light is provided for activating the cell 115, the vermiculite in a filled chamber obscuring or interrupting the light beam impinging upon the cell 115.

A vibrator 116 on the chute 113 is operatively connected to receive a signal from the cell 115, a condition indicative of a partially empty chamber. When the vibrator is activated, the chute 113 is oscillated, whereby flow from the hopper to the chamber 114 is accelerated.

The material vermiculite has a substantial tendency to clump, form voids and remain in non-compacted configuration due to its very low density, coupled with its large particle size. In order to prevent the formation of voids and assure filling of the cavities, an auger assembly 117 is provided at the lowermost end 118 of the chamber 114. The auger is rotated in a sense which will induce feed of the vermiculite in a direction opposite to the direction of rotation of the disk 100.

The auger is journalled at its ends 119, 120 in bearing apertures formed in walls 121, 122 of a housing 123 surrounding the chamber 114. A bevel gear 124 is fixed to the end 120 of the auger assembly, the gear mating with a complemental bevel gear 125 secured to shaft 126, driven by a flexible cable 127.

In the noted arrangement the auger will tend both to agitate and withdraw increments of the vermiculite material whereby a positive pressure tending to fill the cavities is developed.

To avoid spillage, a suction manifold 128, including a plurality of scavenger pipes 129, is provided for removing excess materials which have extended beyond the confines of the housing and mold cavities.

The apparatus may include one or more wiper or doctor blades 130 in trailing or downstream position with respect to each filling station, to assure levelling of the filled cavities.

131 represents a second station for filling with a cushioning or blanketing material, such as the material Sorbitol, it being understood that the plunger 102 will have been lowered slightly as it passes in a clockwise direction from the filling station for the vermiculite to the second filling station, providing room for the Sorbitol layer.

A scraper 132 may likewise be disposed in trailing position of the station 131 for leveling the Sorbitol layer. The Sorbitol material is deposited through a chute 133 leading to a hopper or bulk supply source (not shown).

Optionally, the trailing edges of the scrapers 130 and 132 may be disposed at angles leading toward the suction pipes 129, whereby excess materials are deflected radially outwardly into the entranceway of the pipes.

The mold cavities C, which have been filled with a single vermiculite layer and a single Sorbitol layer, are passed beneath the aperture 87 in the nesting plate 64 in timed relation with the rotation of distributor plate 53. As each cavity C registers beneath the aperture 87, a pocket 77 in plate 53 will, by reason of the snychronized movements of the plate, be disposed above the aperture 87, resulting in the deposit of the contents of the pocket into the mold cavity.

Continued rotation of the cavity disk 100 brings the cavities sequentially beneath an embedding station, as best seen in FIGS. 11 and 12. The embedding station comprises a spaced pair of brackets 134, 135, each of which brackets include a vertically directed slot member 136, 137, respectively, the slots being aligned in a common plane. A shaft 138 has its opposed ends mounted within the slots 137, 136, the shaft fixedly carrying a friction roller 139 and a tapered embedding roller 140. The shaft is yieldably biased downwardly within the limits of the slots 136, 137 by a hair spring member 141.

As a result of the weight of the rollers 139 and 140 and the pressure of spring 141, the roller 139 is pressed against the face of disk 100, resulting in rotation of the roller 139 and, hence, the roller 140. Thus, as the cavities pass beneath the roller 140, the seed S is gently pressed into the Sorbitol layer and the same is leveled.

A scraper blade 142 may be disposed in trailing relation of the roller 140 to remove any excess or accumulation of filler materials, the suction scavenger pipes 129 preventing any accumulation in the area of the scraper blade.

After the filling and impressing operations, the lower plungers 102 will shift downwardly, providing room for an additional layer of Sorbitol from the hopper 143 and chute 144, the plunger, after Sorbitol is added to the cavities, again descending to receive a second layer of vermiculite from the hopper 145 and feed chute 146.

The second vermiculite feed station will preferably include an auger assembly as previously described to assure continuous feed and thorough filling of the cavities with the second vermiculite charge.

After the cavities have been fully charged, plungers 101 are shifted toward plungers 102 by the previously described cam pressure roller, compressing and compacting the materials into the environmental seed cell, as shown in FIG. 13.

As noted in the aforesaid U.S. Pat. No. 3,690,034, the seed cells are formed through the application of a greater pressure at their periphery than at the central portions in registry with the seed, such pressure differential, as noted in said patent, resulting from the shape of the mold cavities. There is thus provided a cell with increased durability and structural integrity, without likelihood of damaging the seed through the application of inordinately high pressures. The fact that the peripheral areas of the pellet or seed cell are subject to great, possibly damaging, pressures underscores the importance of locating the seed centrally of the mold cavity in the area of lesser compression. The desired central location is achieved in an essentially fail-safe manner by the transfer mechanism hereinabove described wherein the seed falls only a short distance into the cavity C from table or nesting plate 64.

Figure 14:
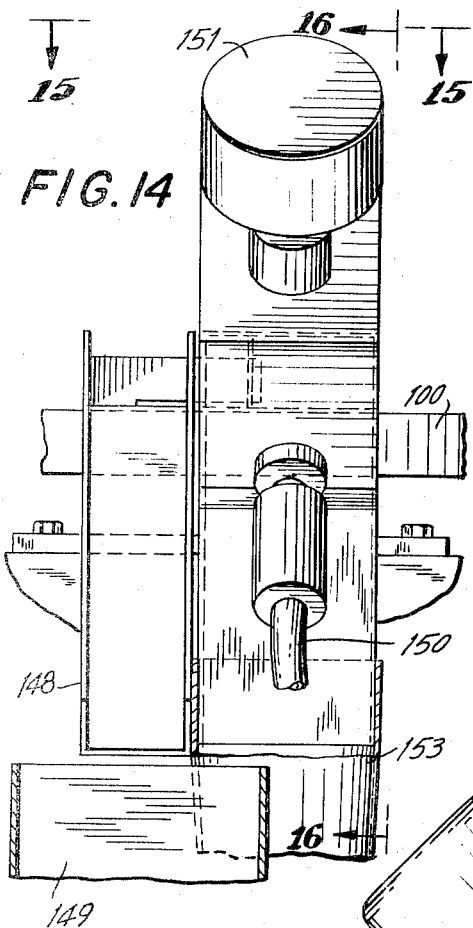
FIG. 14 is a front elevation of the ejector mechanism for sorting proper and improper tablets.
Figure 15:
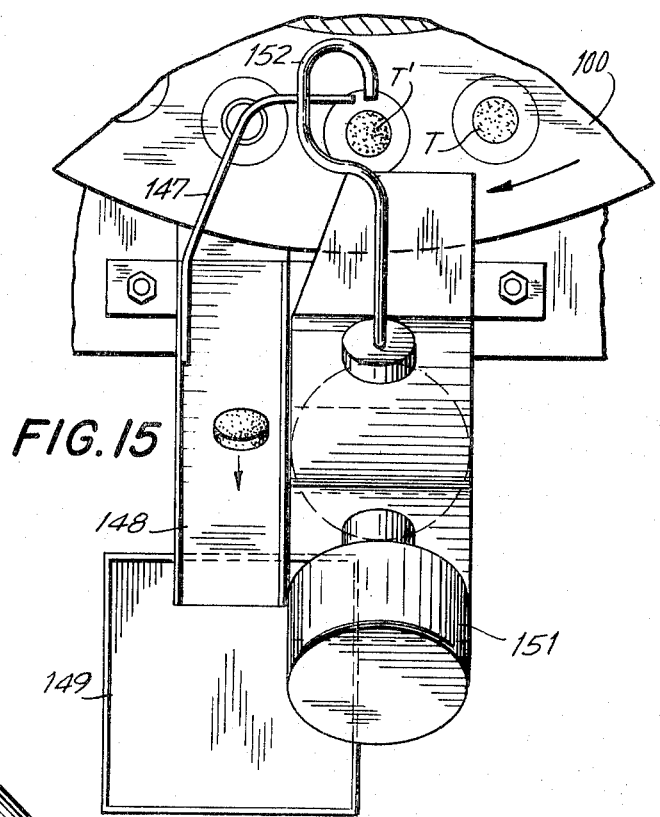
FIG. 15 is a plan view taken in the direction of the arrows 15—15 of the sorting mechanism of FIG. 14.
Figure 16:
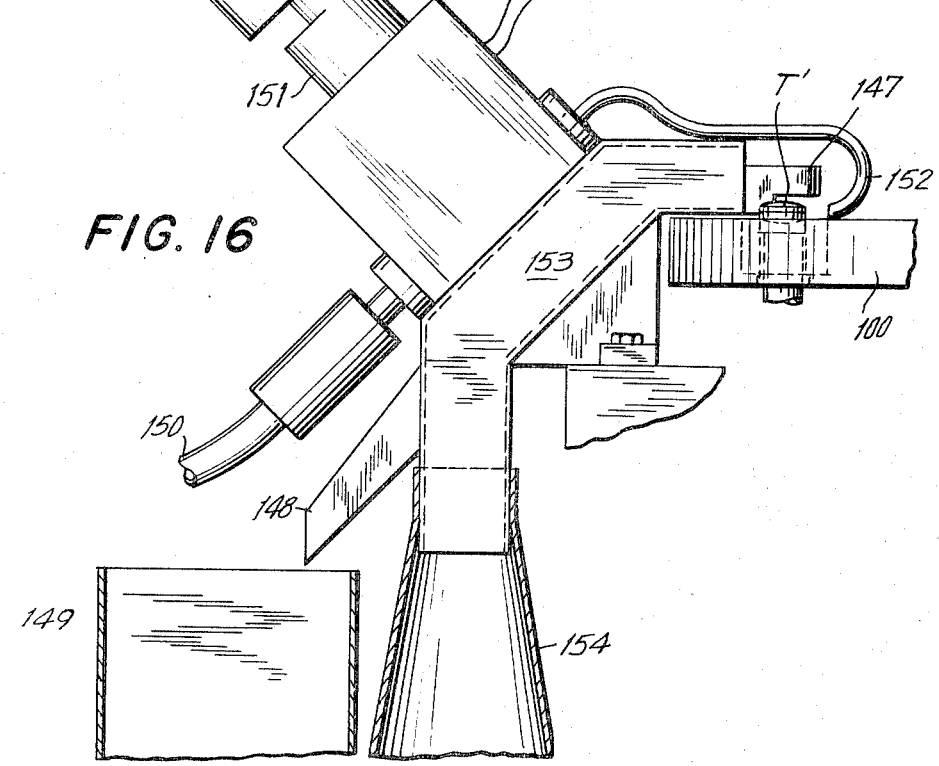
FIG. 16 is a side elevational view taken in the direction of the arrows 16—16 of FIG. 14.

FIGS. 14 to 16 show details of the selector mechanism for separating improperly charged environmental cells (i.e., those containing no seed or more than one seed) from those which are properly formed, i.e., in which a single seed has been deposited.

Referring particularly to FIG. 15, the tablets T which, by this stage, have been lifted by raising of the plungers 102 and 101 to the level of the disk 100, are advanced toward the discharge station whereat, if properly formed, they will be engaged against a gate mechanism 147 extending across the path of the tablets T. The rotation of the plate 100 will, by reason of the angularity of the gate 147, cause the tablets to be deflected radially to the discharge chute 148 leading to the tablet storage bin 149. If, however, the detector member 62 has sensed that no seed or more than one seed has been introduced into a tablet, a memory storage unit M, FIG. 2, records this fact, and when said tablet T' reaches the position shown in FIG. 15, air from the compressed air conduit 150 is admitted by the control valve 151 to reject jet tube 152, whereby the defective tablet is ejected into discharge chute 153 and waste bin 154.

The foregoing apparatus provides an efficient, economical and effective means for forming environmental seed cells in a tableting apparatus, with a minimum of required manual attention and supervision. It is only necessary that the hoppers containing the tablet forming charges be periodically refilled and that the seed supply be maintained at a sufficient level that the pickup nozzles are scanned or pass through a bulk supply.

Seeds are handled in a manner which minimizes any possibility of damage, are introduced into the mold cavities at a precise, predetermined position, and in a manner which is unlikely to disturb the light, readily dispersed powder and vermiculite charge of which the pellets are preferably formed.

The provision of a unique auger at the point of distribution of the material into the mold cavities assures against the formation of voids and augments the feed of the light vermiculite to the mold cavities.

In accordance with the embodiment of FIG. 17, an improved transfer mechanism is disclosed wherein the seed or like light weight object may be fed from one point to another under the influence of an air stream, the apparatus being such as to dissipate the turbulence effects of the air stream at the output end of the conveyor, the airborne object being advanced to the terminal ends of the conduit by inertia achieved during earlier stages of transit.

Having thus described the invention and illustrated its use, what is claimed as new and is desired to be secured by letters Patent is:

1. A tableting apparatus for forming an environmental seed cell having a central seed surrounded by layers of compressed environmental material comprising, in combination, means for selecting single seeds from a bulk seed supply, conveyor means including a conduit for receiving said single seeds and advancing the same in an air stream flowing through said conveyor means, transfer mechanism positioned at the terminal end of said conveyor means for receiving said seeds, said transfer mechanism including a support table, a distributor disk slidably mounted over said support table and including individual pockets, means for rotating said distributor disk relative to said table serially to align said pockets with said terminal end of said conveyor, said disk moving in timed relation sequentially to align a pocket with said terminal end as each seed emerges from said end, an air relief passage means formed in said disk and communicating with each said pocket, a screen member disposed in each said air release passage, said screen being of a size to permit flow of air therethrough and to block the passage of said seed, a vertically disposed discharge aperture means formed in said table in the path of movement of said pockets for receiving seeds advanced by said pockets, tableting means including a mold disk having a multiplicity of mold cavities and means for rotating the cavities of said mold disk into registry with said discharge aperture in said table in synchronism with the movement of said pockets of said distributor disk into registry with said aperture, whereby individual seeds are deposited in said mold cavities.

2. Apparatus for forming environmental seed cells, each comprising a centrally disposed seed surrounded by layers of compressed protective environmental material, comprising a tableting apparatus including mold cavities, singulating means for removing single seeds from a bulk supply and releasing the same at a discharge station, and a transfer assembly for transporting said removed single seeds from said singulating apparatus and depositing the same in said mold cavities, said transfer assembly including a tubular conduit having an entrance end and an exit end, said entrance end being positioned adjacent said discharge station of said singulating means, air inlet means downstream of said entrance end of said conduit for admitting air under pressure to said conduit, to induce air flow therein in the direction from said entrance to said exit end, the portion of said conduit between said air inlet means and said entrance end defining a Venturi tube whereby admission of air through said inlet means creates subatmospheric pressure at said entrance and superatmospheric pressure in said conduit beyond said inlet means.

3. In an apparatus for forming environmental seed cells, transfer mechanism for receiving individual seeds fed by a singulator mechanism and releasing the same to the mold cavities of a tableting machine, comprising tubular air feed conveyor means for advancing said seeds in an air stream, a horizontally disposed seed receiver disk member, means for rotating said disk member about a vertical axis, a stationary seed support table beneath said disk member, the under surface of said disk being disposed in sliding engagement with the upper face of said table, a plurality of seed receiver pocket means formed through said disk for receiving seeds from said air conveyor and advancing the same along said table, said pockets each including an entrance channel extending downwardly from the top face of said disk and terminating at said table, a downwardly directed air vent channel communicating with said entrance channel at its lower end, the upper end of said vent channel opening to the exterior of said disk, said vent channels including a screen member therein in spaced relation to said table, said screen being of a mesh size to permit air freely to pass therethrough, but to prevent passage of said seed, a discharge aperture formed in said table positioned to register sequentially with said pockets of said rotating disk, and a tablet forming apparatus including a plurality of mold cavity means adapted sequentially to register with said discharge aperture, for receiving said seeds.

4. Apparatus for fabricating environmental seed cells having a centrally disposed seed within protective compacted upper and lower layers, comprising singulator means for extracting individual seeds from a bulk supply, transfer means for receiving single seeds supplied by said singulator means, said transfer means including a support table, a distributor disk mounted for rotation in sliding engagement with said table, a plurality of seed receiver pocket means formed in said disk positioned to be serially filled by said singulator means and to advance seeds in said pockets while the seeds are supported on said table along an arcuate path, a vertical extending discharge passage formed in said table, the upper end of said passage lying in said path, tablet forming means including a mold disk rotatable about a vertical axis and having a plurality of vertically directed mold cavities concentrically spaced relative to said axis, said cavities being positioned to register sequentially with the lower end of said passage of said table, synchronized drive means for rotating said distributor disk and said mold disk in timed relation sequentially to align successive pockets of said distributor disk with the upper end of said passage of said table and simultaneously align successive cavities of said mold disk with the lower end of said passage, and supply means for filling cavities of said mold with a light, particulate material having a relatively large particle size, such as vermiculite, said supply means including an inclined delivery chute having a hopper at its upper end, and a lower end defining a downwardly open discharge station over said mold disk, said mold disk forming a floor at said station, said mold cavities being positioned sequentially to register beneath and scan said station, whereby said material is deposited in said cavities as the latter traverse said station, said discharge station including rotating auger means adjacent said cavities for augmenting feed of said material to said cavities.

5. The apparatus of claim 4 wherein said auger means includes components in registry with said cavities and components downstream of said cavities, said auger means being rotated in a sense effective to retract particulate material in a direction opposite to the direction of movement of said mold cavities.

6. The apparatus of claim 5 wherein said discharge station is in the form of an inverted shell disposed in proximate spaced relation to said mold disk, said shell including end wall means adjacent the downstream terminus of said auger for preventing feed of said material by said auger beyond said wall means.

* * * * *